United States Patent [19]

Martino

[11] Patent Number: 5,272,323
[45] Date of Patent: Dec. 21, 1993

[54] DIGITIZER FOR BARCODE SCANNER

[75] Inventor: Raymond A. Martino, San Jose, Calif.

[73] Assignee: Symbol Technologies, Inc., Bohemia, N.Y.

[21] Appl. No.: 758,243

[22] Filed: Sep. 10, 1991

Related U.S. Application Data

[63] Continuation of Ser. No. 440,510, Nov. 22, 1989, abandoned.

[51] Int. Cl.⁵ .............................................. G06K 7/10
[52] U.S. Cl. .................................................. 235/462
[58] Field of Search ............... 235/436, 462, 463, 476

[56] References Cited

U.S. PATENT DOCUMENTS

| | | | |
|---|---|---|---|
| 3,909,594 | 9/1975 | Allais et al. | 235/462 |
| 4,000,397 | 12/1976 | Hebert et al. | 235/462 |
| 4,020,357 | 4/1977 | Punis | 235/462 |
| 4,091,379 | 5/1978 | Wu et al. | 235/462 |
| 4,158,435 | 6/1979 | Nakanishi et al. | 235/463 |
| 4,356,389 | 10/1982 | Quirey et al. | 235/455 |
| 4,740,675 | 4/1988 | Brosnan et al. | 235/462 |
| 4,749,879 | 6/1988 | Peterson et al. | 307/354 |
| 4,833,309 | 5/1989 | Yomogida | 235/462 |

Primary Examiner—John W. Shepperd
Attorney, Agent, or Firm—Arnold, White & Durkee

[57] ABSTRACT

A bar code scanner employs a digitizer for the signal produced by a photodetector in response to light reflected from a bar code symbol. The digitizer uses a first derivative of the signal to detect peaks, and determines the amount of movement of the signal after each peak to see if a threshold amount of movement has occurred. A second derivative of the signal is used to detect inflection points, and when one occurs after the threshold amount of movement following a peak, a valid transition of the signal is signalled. These valid transitions are decoded to recover the bar code pattern. The threshold used is adjustable to optimize the digitizing for different types of bar code symbols and other conditions, or to provide a squelch function. Dynamic control of the threshold provides a varying response to the scanned bar code symbol. Zero-crossing detectors used with the first and second derivative circuits may also have variable thresholds.

22 Claims, 5 Drawing Sheets

DIGITIZER FOR BARCODE SCANNER

This is a continuation of Ser. No. 07/440,510 filed Nov. 22, 1989 now abandoned.

BACKGROUND OF THE INVENTION

This invention relates to electrical circuits for shaping and digitizing analog signals, and more particularly to a digitizer circuit and digitizing method for a bar code scanner device or similar optical scanner.

Bar code readers are disclosed in U.S. Pat. Nos. 4,387,297, 4,409,470, 4,251,798, and 4,760,248, for example, all assigned to Symbol Technologies, Inc. The bar code readers described in these patents, as well as other devices of this type that are commercially available, employ a photodetector to generate an analog electrical signal representing light reflected from a bar code symbol. The analog electrical signal is usually digitized, i.e., converted to a binary signal having two levels, one or zero, high or low. The binary signal is then decoded to attempt to recover the bar code pattern. The validity of the decoding step is of course dependent upon how faithfully the analog signal has been digitized, and upon the quality of the bar code itself and its background, as well as upon the optical system used to transmit a light beam to the bar code symbol and collect reflected light. The DC level of the analog signal can shift, and various false peaks or dips can appear in the signal due to many factors. In an attempt to account for these types of false indications, one approach has been to detect the derivative and second derivative of the analog signal, and use these values to detect peaks and transitions; a device using these features is disclosed in U.S. Pat. No. 4,000,397, where zero crossings of the second derivative are detected at selected gating times that occur whenever the first derivative exceeds a threshold level, where the threshold level is determined by adding the peak-to-peak levels of the analog signal to a noise measurement signal. Another approach is disclosed in U.S. Pat. No. 4,749,879, also using first and second derivatives or the analog signal and a zero crossing detector gated by threshold detectors. These prior circuits have not be able to recognize some valid bar code patterns, however.

One example of a bar code symbol that presents problems in digitizing is one produced by a dot matrix printer. Here the symbol is created by a pattern of dots, and the gaps between the dots can produce transitions resembling the transitions between bar and space. The signal produced by a symbol printed by a dot matrix printer must be distinguishable, however, from a signal produced by a high density bar code, such as Code-49. A high density bar code symbol may produce a signal from the photodetector that is difficult to distinguish from a signal produced by a low density bar code symbol created by a dot matrix printer; the derivatives of these signals are even more difficult to distinguish.

It is the principal object of this invention to provide an improved bar code scanner device, and particularly one able to more effectively and/or efficiently decode the bar code symbols being scanned. Another object is to provide an improved digitizer for bar code readers or the like. A further object is to provide a bar code scanner device that is versatile, accurate and efficient in operation. An additional object is to provide an improved bar code scanner device that is able to more rapidly adapt to variable conditions, with a minimum of intervention by the operator.

SUMMARY OF THE INVENTION

In accordance with one embodiment of the invention, a digitizer circuit for shaping analog signals produced by a bar code scanner or the like utilizes derivative and second derivative techniques to find peaks and inflections in the analog signal. This digitizer receives the signal produced by a photodetector in response to light reflected from a bar code symbol. The digitizer uses the first derivative of the signal to detect peaks, and determines the amount of movement of the signal after each peak to see if a threshold amount of movement has occurred. The second derivative of the signal is used to detect inflection points, and when one occurs after the detected threshold amount of movement following a peak, a valid transition of the signal is signalled by an output circuit. These transitions in the output are decoded to recover the bar code pattern. The threshold used is adjustable to optimize the digitizing for different types of bar code symbols and other conditions, or to provide a squelch function. Dynamic control of the threshold provides a varying response to the scanned bar code symbol. Zero-crossing detectors used with the first and second derivative circuits also may have variable thresholds.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments that follows, when read in conjunction with the accompanying drawings, wherein:

DETAILED DESCRIPTION OF SPECIFIC EMBODIMENT

Figure 1:
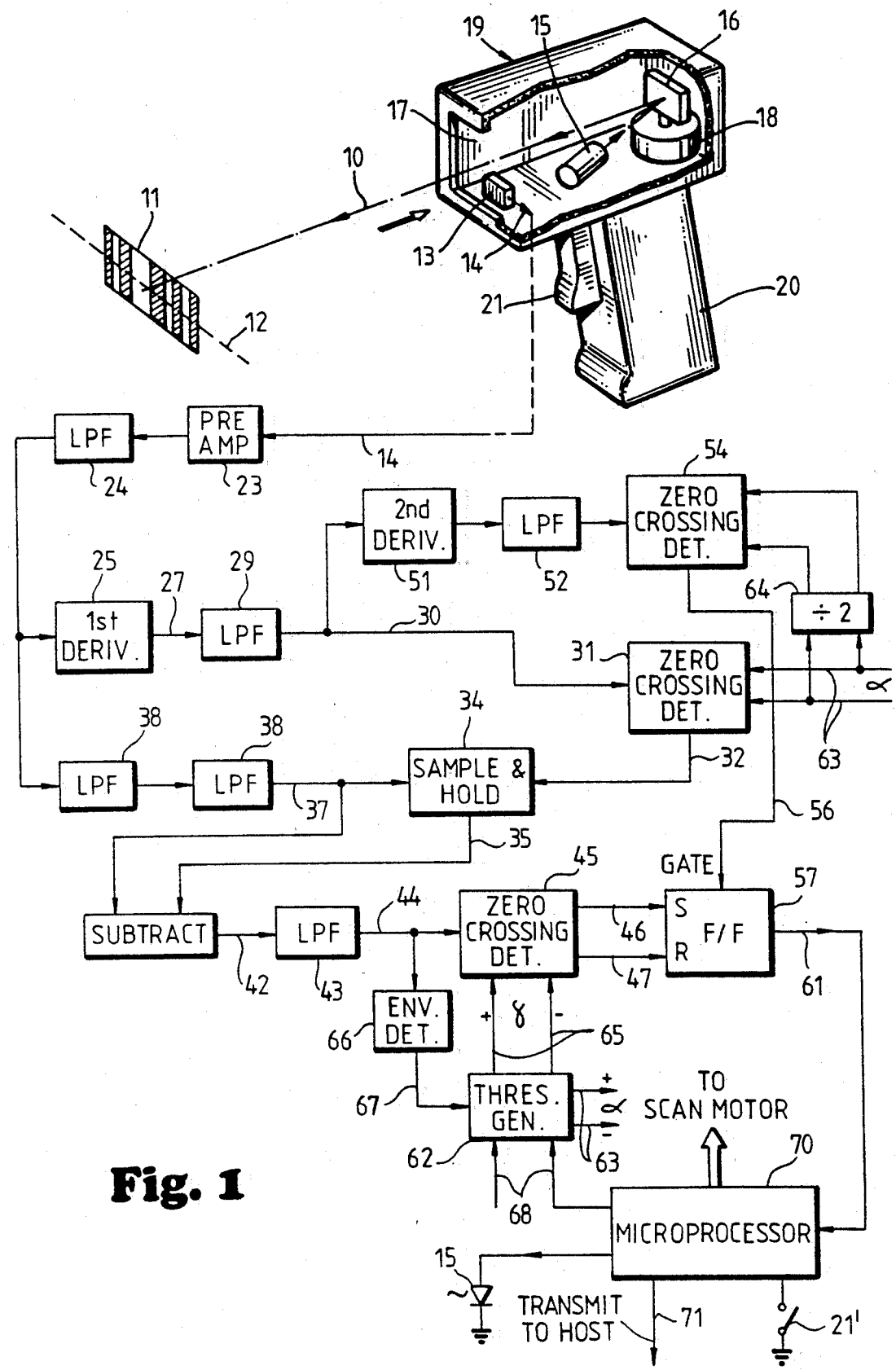
FIG. 1 is an electrical schematic diagram, in block form, of a bar code scanner with a digitizer circuit in accordance with one embodiment of the invention; this Figure includes a pictorial view, partly broken away, of a bar code scanner unit that may utilize the digitizer circuit illustrated.

Referring to FIG. 1, a bar code scanner system is illustrated according to one embodiment of the invention. A scanning beam 10 is directed to scan across a bar code symbol 11 along a scan line 12, and a photodetector 13 is exposed to light reflected from the bar code symbol to produce an analog electrical signal on a line 14. This signal on line 14 is first applied to a preamplifier and a low-pass filter, and then must be shaped and interpreted to produce a signal corresponding to the pattern of the bar code symbol 11, and for this purpose the digitizer circuitry as described below is employed.

The scanning beam 10 may be generated by a laser source 15 or light-emitting diode, producing a beam directed to an oscillating mirror 16 that directs the beam onto the symbol 11 through a transparent window 17 in the front of the housing; the mirror is oscillated by a motor 18 to create the scan pattern. The assembly is often configured as a hand-held unit 19 as seen in FIG. 1, where the user holds the unit by a handle 20 and activates the light source and scan by a trigger switch 21. The laser beam 10 exits from the unit 19 through the window 17, and the reflected light from the symbol 11 enters through this window to impinge upon the photodetector 13. Of course, the features of the invention are equally applicable to bar code readers of the stationary type, rather than portable hand-held units as illustrated in FIG. 1. Likewise, the digitizer as described below could be used in a wand-type bar code reader, instead of a scanned type as shown, and in addition could be used for character readers or the like, as well as for bar code readers.

Figure 2A:
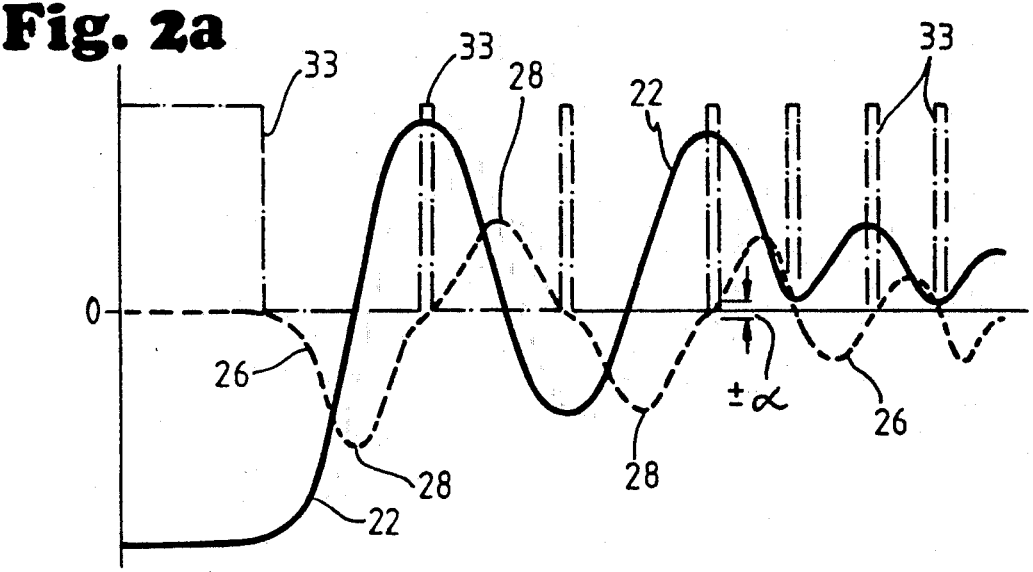
FIGS. 2a-2f are timing diagrams of events (e.g., voltage) vs. time for occurrences in operation of the digitizer circuit of FIG. 1.

Referring to FIG. 2a, the signal 22 produced by the photodetector 13 on line 14 may be deeply modulated, due to the interaction of the beam 10 with the bar code symbol. Also, the DC level shifts due to background illumination and other factors. This signal is not susceptible to being easily digitized, since the usual method of digitizing by comparing the signal with a threshold will miss the signals produced when the level shifts severely and omits the zero crossings.

According to the invention, the signal on the line 14 is first applied to a preamplifier 23 and a low-pass filter 24, and then to the input of a derivative circuit 25 of FIG. 1, functioning to produce a derivative signal 26 as seen in FIG. 2a (a negative derivative). This derivative signal 26 at the output 27 of the derivative circuit 25 has peaks 28 at zero-crossings of the input signal 22, and zeros at the peaks of the input signal 22. The ideal derivative circuit 25 exhibits a gain that increases at 20 dB/decade and has a 90° phase shift. When constructed in an integrated circuit, however, process limitations will impose a pole in the response of the derivative circuit that will begin to degrade phase within a decade of the pole. If the pole is made to be a little above the maximum expected signal frequency $f_0$ in the signal 22 (the cutoff frequency of a following low pass filter 29) then a linear 20-dB/decade increase in gain up to $f_0$ is obtained as desired, but phase shift will begin to degrade at $f_0/10$ so to compensate for this phase problem a unity-gain amplifier with a matching pole is interposed in the signal path to match the phase degradation to that of the derivative circuits. The low-pass filter 29 following the derivative circuit 25 limits high frequency noise; again a matching low-pass filter is repeated in the signal path to match phases. For relatively low scan rates the cutoff frequency of the low-pass filter 29 is about 30-KHz, while for high scan rates this cutoff frequency is perhaps 200-KHz.

Figure 2B:
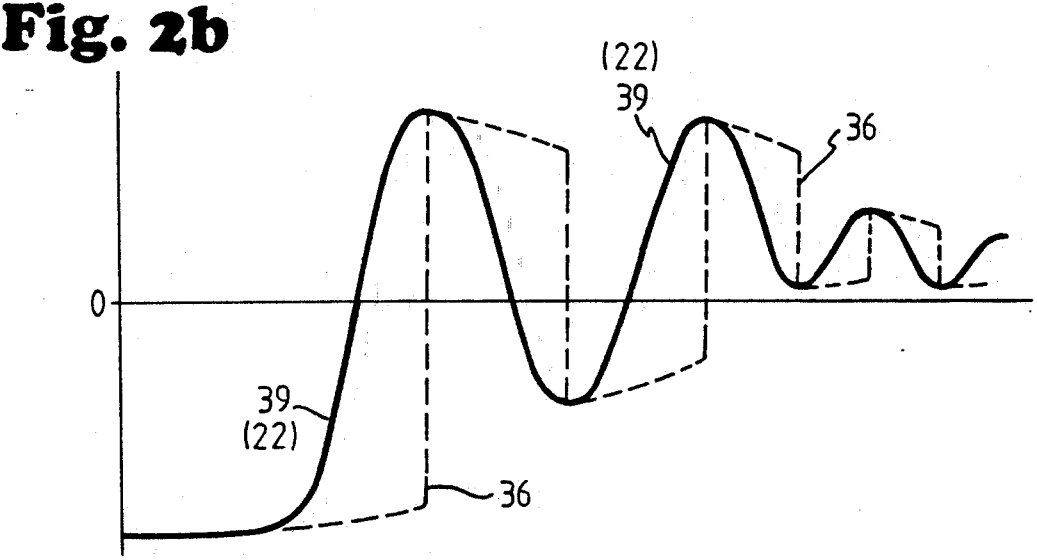
Figure 2C:
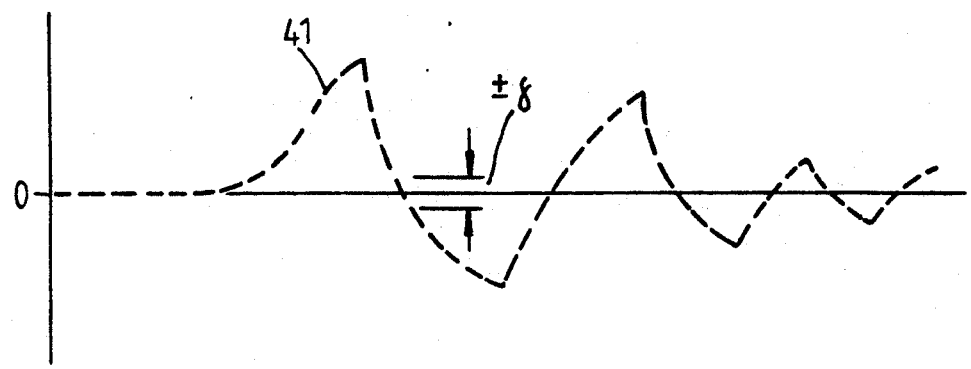

The derivative signal 26 at the output 30 of the low-pass filter 29 is applied to the input of a zero-crossing detector 31 producing a pulse output on line 32 of FIG. 1 that is illustrated in FIG. 2a as a two-level signal 33; this pulsed signal 33 is at a high level whenever the derivative signal 26 is within $\pm a$ of analog ground, and is at a low level at all other times. The value $a$ is a threshold level and may be variable as will be explained below. Since the derivative of a signal is proportional to its slope a derivative of zero indicates a peak; therefore the pulse signal 33 is active-high during the peaks of the signal 22 (both positive-going and negative-going peaks). The pulse signal 33 on line 32 is applied to a sample-and-hold circuit 34, producing an output on line 35 as seen in FIG. 2b as the signal 36. The other input 37 of the sample-and-hold circuit is a replica of the signal 22 that has been passed through low-pass filters 38 to provide the same phase shift and noise filtering as the signal 22 going through the derivative circuit 25 and filter 29. This input 37 is shown in FIG. 2b as signal 39. The pulse signal 33 applied to the sample-and-hold circuit 34 functions to hold each peak of the signal 39 to produce the signal 36 on output line 35. These two signals 36 and 39 on lines 35 and 37 are inputs to a subtractor circuit 40, where the signal 36 is subtracted from the signal 39 to produce a signal on an output line 42. This signal 41 represents the amount of change in the analog signal 22 since its last high or low peak. Again, the signal 41 is passed through a low-pass filter 43 to remove high frequency noise, and the output on line 44, of the shape as the waveform 41 of FIG. 2c, is a signal which equals the magnitude of change of the input signal 22 or 39 since its last peak (the last peak is delineated by the pulsed signal 33).

Figure 2D:
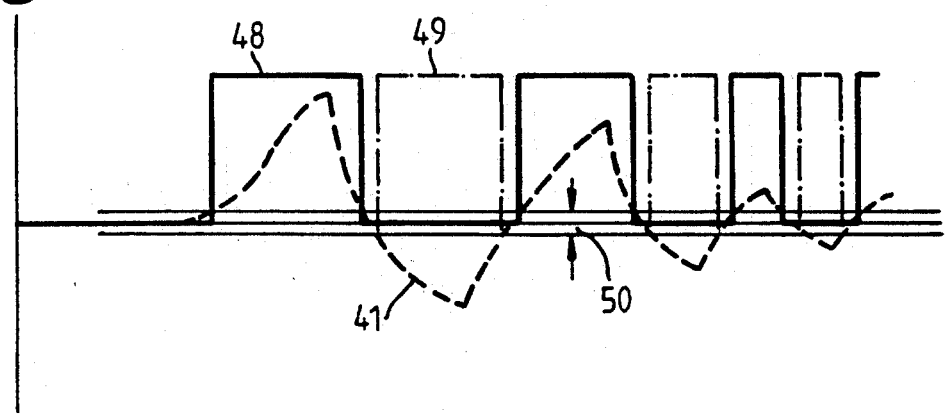

The signal 41 at the output 44 is applied to another zero-crossing detector circuit 45 that produces two outputs on lines 46 and 47 as seen in FIG. 2d as signals 48 and 49. The rising edge of the signal 48 on output line 46 represents a positive going peak; this signal 48 goes active-high when the signal 41 crosses an upper threshold $+\delta$ while the signal 41 is going from negative to positive, and goes to zero when the signal 41 crosses the upper threshold $+\delta$ while going from positive to negative. The signal 49 on output line 47, conversely, goes active-high when the signal 41 crosses a lower threshold $-\delta$ while this signal 41 is going from positive to negative, and goes to zero when the signal 41 crosses the lower threshold $-\delta$ while going from negative to positive. The difference between the lower and upper thresholds $-\delta$ and $+\delta$ in the circuit 45 is a variable value 50 as seen in FIG. 2d. In this manner, the times when the input signal 22 is $\pm \delta$ from its last peak are represented by the signals 48 and 49. The thresholds are not necessarily symmetrical; i.e., $\pm \delta$ can be $+\delta_1$ and $-\delta_2$.

Figure 2E:
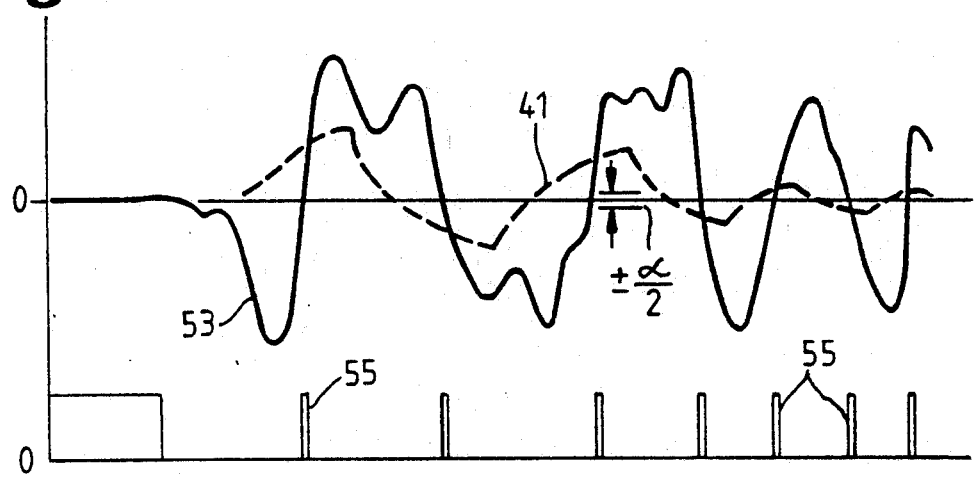
Figure 2F:
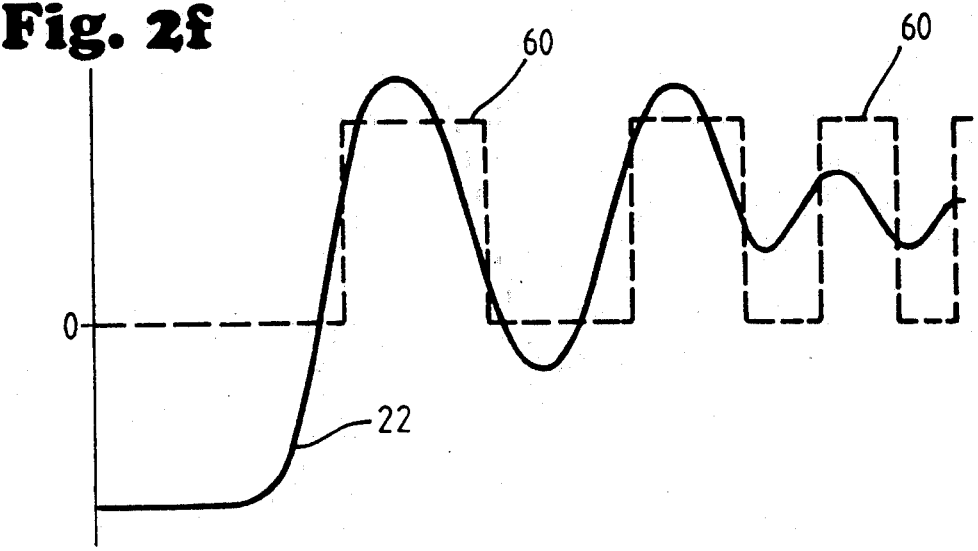

The first derivative signal 26 on line 30 is passed through another derivative circuit 51 and a low-pass filter 52 to produce a second derivative signal 53 as seen in FIG. 2e. The input 44 of the zero-crossing detector 45 is phase-delay matched to the signal 53 by the subtractor 40 and low-pass filter 43, so the second derivative signal 53 is 90° shifted with respect to the output 44 of low-pass filter 43 until at least $f_0$. This signal 53 from the low pass filter 52 is applied to a zero crossing detector 54 having thresholds $+a/x$ and $-a/x$, producing a signal 55 on line 56 that is active high when the signal 53 is within $\pm a/x$ of analog ground (where x is any number, e.g., "2"). Since a zero for a second derivative indicates an inflection point (a change in slope) then the signal 55 is active-high during the inflection points of the filtered input signal 22. The object here is to identify the times when the analog input signal 22 is at an inflection point and the signal 22 has moved at least some threshold amount $\pm \delta$ since its last peak, as defined by the signal 41. To this end, this signal 55 on line 56 is applied to a gating input of a set-reset circuit 57 (a gated flop-flop circuit). The flip-flop 57 uses the signal 48 as its set input and the signal 49 as its reset input, but is responsive to these set and reset inputs only if the signal 55 at the gating input 56 is active-high. The flip-flop 57 thus produces an output 60 as seen in FIG. 2f on the line 61 of FIG. 1; this is the desired digitized output and represents an optimized digital version of the analog signal 22, closely representing the bar code pattern. This signal 60 goes high whenever the input signal 22 is greater than $+\delta$ from its last low peak and the input signal 22 is at an inflection point; the signal 60 stays high until the input signal 22 passes a positive peak by $-\delta$ and is at an inflection point.

The thresholds $\alpha$ and $\delta$ can be adjusted to accommodate different input signal characteristics or accuracy requirements. A variable voltage generator 62 produces $\alpha$ threshold control voltages (a $+\alpha$ reference voltage and a $-\alpha$ reference voltage) on lines 63 going to the zero-crossing detector 31, and through a divide-by-x circuit 64 to the zero-crossing detector 54. The voltage generator also produces $\pm\delta$ threshold control voltages on lines 65 going to the zero-crossing detector 45. In one embodiment, the threshold control generator 62 functions as a squelch control. To this end, an envelope detector 66 produces a signal on its output 67 that is responsive to the envelope of the signal 41 at the node 44, and this output 67 is compared to a threshold voltage $\delta_1$ in the generator 62; the $\pm\delta$ control voltages on the lines 65 are adjusted according to a comparison of the voltages of output 67 and $\delta_1$. When the output 67 of the envelope detector is greater than $\delta_1$ then $\delta_1$ is lowered to a new value $\delta_2$ or when the envelope detector output 67 falls below $\delta_2$ the $\delta_2$ output is raised back to its original $\delta_1$, providing a squelch action. If $\delta_1$ is called the noise threshold, $\delta_2$ the signal threshold, $t_1$ the temporal noise threshold and $t_2$ the temporal signal threshold, then the squelch circuit can be described as follows: the squelch circuit turns on and raises the squelch threshold to the noise threshold $\delta_1$ if no signal greater than the signal threshold $\delta_2$ occurs for the temporal signal threshold $t_2$; if a signal surpasses the noise threshold $\delta_1$ for longer than the temporal noise threshold $t_1$ then the squelch circuit turns off and reduces the squelch threshold to the signal threshold $\delta_2$.

The threshold generator 62, in other embodiments, receives inputs 68 from other signal sources to control the threshold levels $\alpha$ and $\delta$. For example, an automatic gain control (AGC) signal may be employed to control the threshold levels. Or, a motor phase related signal from the scanner mirror motor may be used. Likewise, the microprocessor 70 used to control the operation of the scanner itself may be used to generate a control input 68 to the voltage generator 62 in response to some selected condition or conditions. For example, a failure to decode a valid bar code pattern at one setting may be used to trigger a change in the threshold settings to attempt a rescan at a new setting. Or, the threshold settings may be switched on alternate scans to accommodate certain alternative conditions likely to be present. An example of this use of dynamic changing of the thresholds is employed to distinguish between high density bar code patterns and a dot-printed pattern.

The microprocessor 70 executes a program stored in ROM on the chip itself or in external memory, and functions to control the operation of the scanner. The switch 21' operated by the trigger 21 is an input to the microprocessor, used to initiate the activation of the laser diode 15 and the scan motor 18. The microprocessor 70 receives the digitized output 61 and interprets this digital input to recognize the bar code. There are various ways of detecting the existence of a bar code pattern in a serial electrical signal such as that on the line 61; for example, the number of transitions between black and white (1's and 0's) can be counted, and this value, as a function of the length of scan (or transitions per unit length) is a distinguishing factor. In this manner, the bar code pattern would be distinct from other printing on the product label such as text, numbers or graphics intercepted by the scan line 12 of FIG. 1. Another way of distinguishing a serial signal produces by a bar code pattern from that produced by other images is the ratio of black to white per unit length; bar code symbols fall into a range of such ratios different from printed text or alphanumeric characters found on product labels. Still another way of distinguishing is to compare two scans to see if the same sequence of 1's and 0's is produced over a substantial part of the row. In addition, of course, the patterns of 1's and 0's may be compared by the microprocessor to valid code patterns stored in ROM, using a table look-up. Using any one or combination of such methods, the program executed by the microprocessor 70 functions to shut off the scan when a valid decode is obtained for a complete bar code symbol 11. The code data is then transmitted to a host computer by a transmission path 71 that may be an RF link or a multiconductor cable.

The digitizing circuit of FIG. 1 is preferably constructed in a single integrated circuit device. That is, all of the functional blocks from the analog input line 14 to the digitized output line 61 are in a single semiconductor package. The digitizer device and the microprocessor are mounted on a printed circuit board within the housing 19, and the housing may contain a battery so the unit is self-powered; if an RF link is used for the transmission path 71, a portable reader is provided.

Figure 3A:
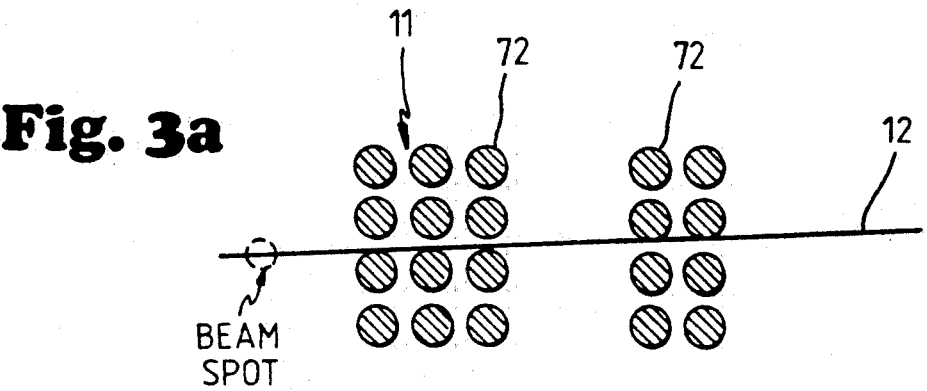
FIG. 3a is a diagram of a bar code symbol being scanned by a light beam.
Figure 3B:
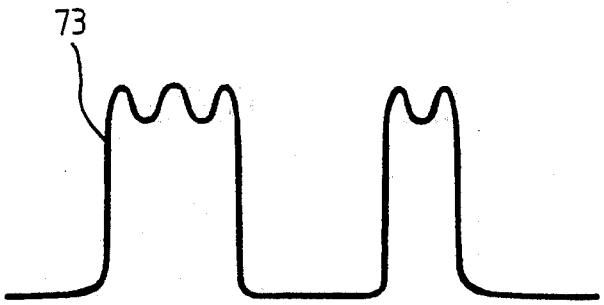
FIGS. 3b and 3c are timing diagrams correlated with FIG. 3a showing voltage vs. time occurring in the circuit of FIG. 1.

Referring to FIG. 3a, a bar code symbol 11 created by a dot matrix printer is formed by a number of black dots 72 rather than solid black bars as is the ideal case. A scan line 12 passing across this symbol produces an analog signal 73 on line 14 as seen in FIG. 3b. The derivative of the signal 73 of FIG. 3b resembles the signal 74 of FIG. 3c. The digitizer of FIG. 1 deals with the situation of FIGS. 3a-3c by raising the value of the threshold $\delta$, so the excursions of the signal 41 do not intercept the levels $\delta+$ and $\delta-$ of FIGS. 2c or 2d for small and short black-white reversals in the pattern.

Figure 3C:
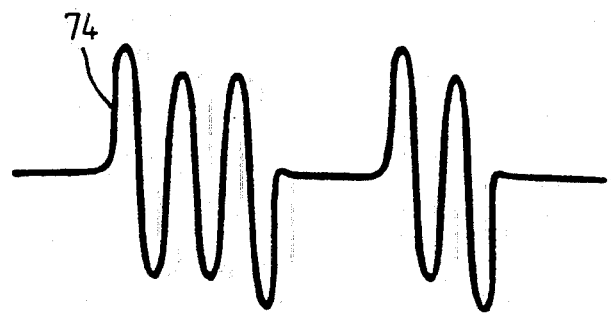
Figure 4A:
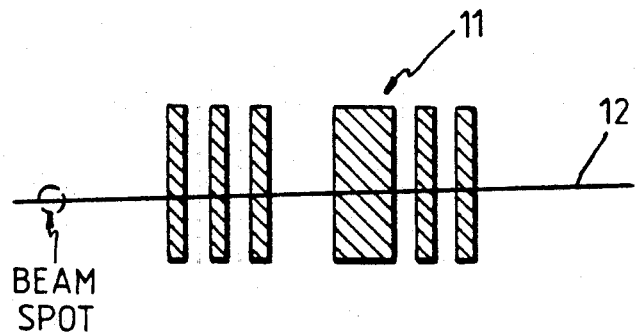
FIG. 4a is another diagram of a bar code symbol being scanned by a light beam.
Figure 4B:
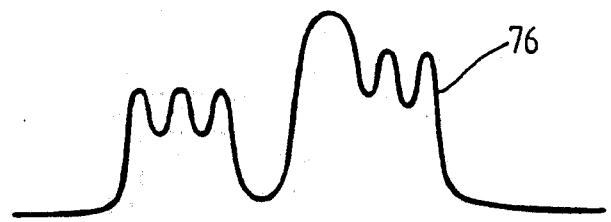
FIGS. 4b and 4c are timing diagrams correlated with FIG. 4a showing voltage vs. time occurring in the circuit of FIG. 1.
Figure 4C:
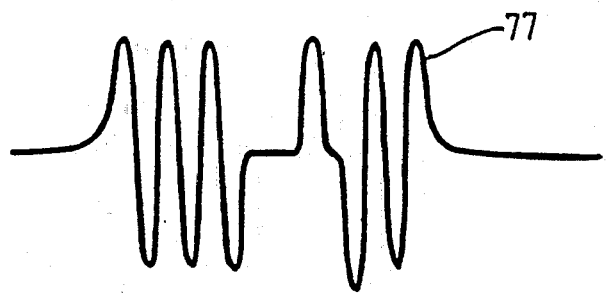

In contrast to the situation of FIGS. 3a-3c, a high-density bar code symbol 11 of the type seen in FIG. 4a having very narrow bars and spaces, producing an analog signal 76 of FIG. 4b and a derivative signal 77 of FIG. 4c, presents a situation of a signal having a remarkably similar appearance to that of FIG. 3b. This signal is to be interpreted as separate bars instead of as dots forming the same bar. If a large threshold $\delta$ is used as needed for the FIG. 3b situation, then the signal of FIG. 4b cannot be decoded properly. Instead, a small threshold $\delta$ is needed here. Therefore, the value of $\delta$ must be controllable in order to operate with both dot matrix and high density symbols. The digitizer of FIG. 1 provides the dynamic control of $\delta$ as is needed; for example, the value of $\delta$ can be changed by varying the voltages on lines 65 during every other laser scan across the bar code symbol, under control of the microprocessor 70, so one scan reads a dot matrix symbol optimally, and the next scan reads a high density symbol in an optimum manner. Or, a selection of values of $\delta$ can be programmed to be asserted by the voltage generator 62 under controls on line 68 from the microprocessor 70, suitable or optimized for all types of bar code symbols expected to be encountered.

It is noted that the effect of controlling the value of α (the derivative magnitude threshold) is not the same as that of controlling δ. Since the derivative magnitude increases with frequency (e.g., FIGS. 3c or 4c), the ripple in the dot matrix symbol (FIG. 3a) would produce a magnitude after taking the derivative much closer to the magnitude of the large low frequency signal (produced by the bars and spaces) than to the magnitude of the ripple on the input signal (FIG. 3b). For this reason the sample-and-hold digitizer of FIG. 1 can perform better than digitizers that use only derivative information and no signal amplitude information.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A digitizer circuit for producing a digital output from an analog input, comprising:
   a) a first differentiator and first zero-crossing detector receiving said analog signal and producing a pulse output representing peaks of said analog signal;
   b) a sample-and-hold circuit receiving said analog signal and said pulse output to produce a sample output corresponding to the magnitude of the last peak of said analog signal;
   c) a circuit for subtracting said sample output from said analog signal and comparing the result to a selected threshold to produce a representation of when said analog signal has changed by an amount of said threshold since the last peak of the analog signal;
   d) a second differentiator and second zero-crossing detector receiving said analog signal and producing a gating signal representing inflection points of said analog signal; and
   e) an output circuit generating an output signal having transitions when said representation is active and said gating signal is active.

2. A circuit according to claim 1 wherein first and second zero-crossing detectors operate with predetermined thresholds which are adjustable.

3. A circuit according to claim 1 wherein selected threshold is adjustable.

4. A circuit according to claim 1 combined with a bar code scanner producing said analog signal.

5. A circuit according to claim 4 including decoder means receiving said output signal to detect bar code patterns.

6. A method of operating a bar code scanner for digitizing an analog signal produced in the bar code scanner, comprising the steps of, in said bar code scanner:
   a) differentiating said analog signal and determining zero-crossing of the differential of said analog signal to produce a pulse output representing peaks of said analog signal;
   b) sampling said analog signal in response to said pulse output and holding the level of said sample to produce a sample-and-hold signal;
   c) subtracting said sample-and-hold signal from said analog signal to produce a first signal;
   d) comparing said first signal to a selected first threshold to produce a representation of when said analog signal has changed by an amount of said first threshold since its last high or low peak;
   e) generating a second derivative of said analog signal and detecting zero crossings of said second derivative to produce a gating signal;
   f) generating an output having transitions when said representation is active and said gating signal is active.

7. A method according to claim 6 wherein said selected first threshold is adjustable.

8. A method according to claim 7 wherein said first threshold is adjustable in response to a condition of said analog signal.

9. A method according to claim 6 wherein said steps of determining zero-crossing detectors include comparing with predetermined thresholds which are adjustable.

10. A method of digitizing an analog signal comprising the steps of:
    a) generating a pulse output representing peaks of said analog signal;
    b) generating a hold signal representing the level of said analog signal when said pulse output is active;
    c) comparing a selected threshold to the difference between said analog signal and said hold signal, to produce a representation of when said analog signal has changed by an amount of said selected threshold since its last high or low peak;
    d) generating a gating signal corresponding to inflections of said analog signal;
    e) generating an output having transitions when said representation is active and said gating signal is active.

11. A method according to claim 10 including the steps of generating a bar code scanning beam, and generating said analog signal by a light detector responsive to reflected light from a bar code symbol scanned by said beam.

12. A method according to claim 11 including the step of decoding said output to recover the pattern of said bar code symbol.

13. A method according to claim 12 wherein the width of pulses of said pulse output is determined by the length of time said analog signal is within a first threshold level of a peak.

14. A method according to claim 12 wherein said analog signal is generated by a light detector in a bar code scanner.

15. A method according to claim 14 wherein said output is decoded to determine a bar code pattern.

16. A method according to claim 10 wherein said step of generating a pulse output is in response to a first threshold level corresponding to when said analog signal is within a selected value of a peak.

17. A method according to claim 16 wherein said step of generating a pulse output includes differentiating said analog signal and detecting zero-crossings of the differential.

18. A circuit for digitizing a bar code scanner signal comprising:
    a) means for generating a pulse output representing peaks of said scanner signal;

b) means for generating a hold signal representing the level of said scanner signal when said pulse output is active;
c) means for comparing a selected threshold to the difference between said scanner signal and said hold signal, to produce a representation of when said scanner signal has changed by an amount of said selected threshold since its last high or low peak;
d) means for generating a gating signal corresponding to inflections of said scanner signal;
e) means for generating an output having transitions when said representation is active and said gating signal is active.

19. A circuit according to claim 18 wherein said means for generating includes an adjustable threshold means.

20. A circuit according to claim 18 in combination with a decoder means receiving said output to determine bar code patterns.

21. A bar code scanner comprising:

a) a photodetector producing an electrical signal responsive to light reflected from a bar code symbol scanned by a light beam;
b) a digitizer circuit receiving said electrical signal and producing an output switching between a first level and a second level, the digitizer circuit generating said first level then maintaining said first level until exhibiting a change of state to produce said second level when said electrical signal exhibits an inflection after having changed in value by at least a selected threshold amount from a positive or negative peak; said digitizer circuit having means including a peak detector and a sample-and-hold circuit for producing an indication of said electrical signal having changed in value by at least said selected threshold amount from a positive or negative peak;
c) a decoder responsive to said first and second outputs to recognize said bar code symbol.

22. A bar code scanner according to claim 21 wherein said selected threshold is alternated between at least two selected values.

* * * * *